May 26, 1970     I. LEIBSON ET AL     3,514,501

PROCESS FOR PREPARING BLOCK POLYMERS FROM ALPHA-OLEFINS

Original Filed July 18, 1963     2 Sheets-Sheet 2

INVENTORS
IRVING LEIBSON
MICHAEL ERCHAK, JR.

BY Fred S. Valles

United States Patent Office 3,514,501
Patented May 26, 1970

---

3,514,501
PROCESS FOR PREPARING BLOCK POLYMERS FROM ALPHA-OLEFINS
Irving Leibson, Wyckoff, and Michael Erchak, Jr., Ridgewood, N.J., assignors to Dart Industries Inc., a corporation of Delaware
Continuation of application Ser. No. 295,926, July 18, 1963. This application Jan. 9, 1967, Ser. No. 629,037
Int. Cl. C08f 15/04
U.S. Cl. 260—878
9 Claims

ABSTRACT OF THE DISCLOSURE

A block copolymerization process wherein a polypropylene prepolymer is formed in a first reactor, the polypropylene is flashed to a substantially dry powder and this product still containing active catalyst is then introduced into one or more vapor phase reactors where further alpha-olefin monomer(s) is added to form a block copolymer.

---

Figure 1:
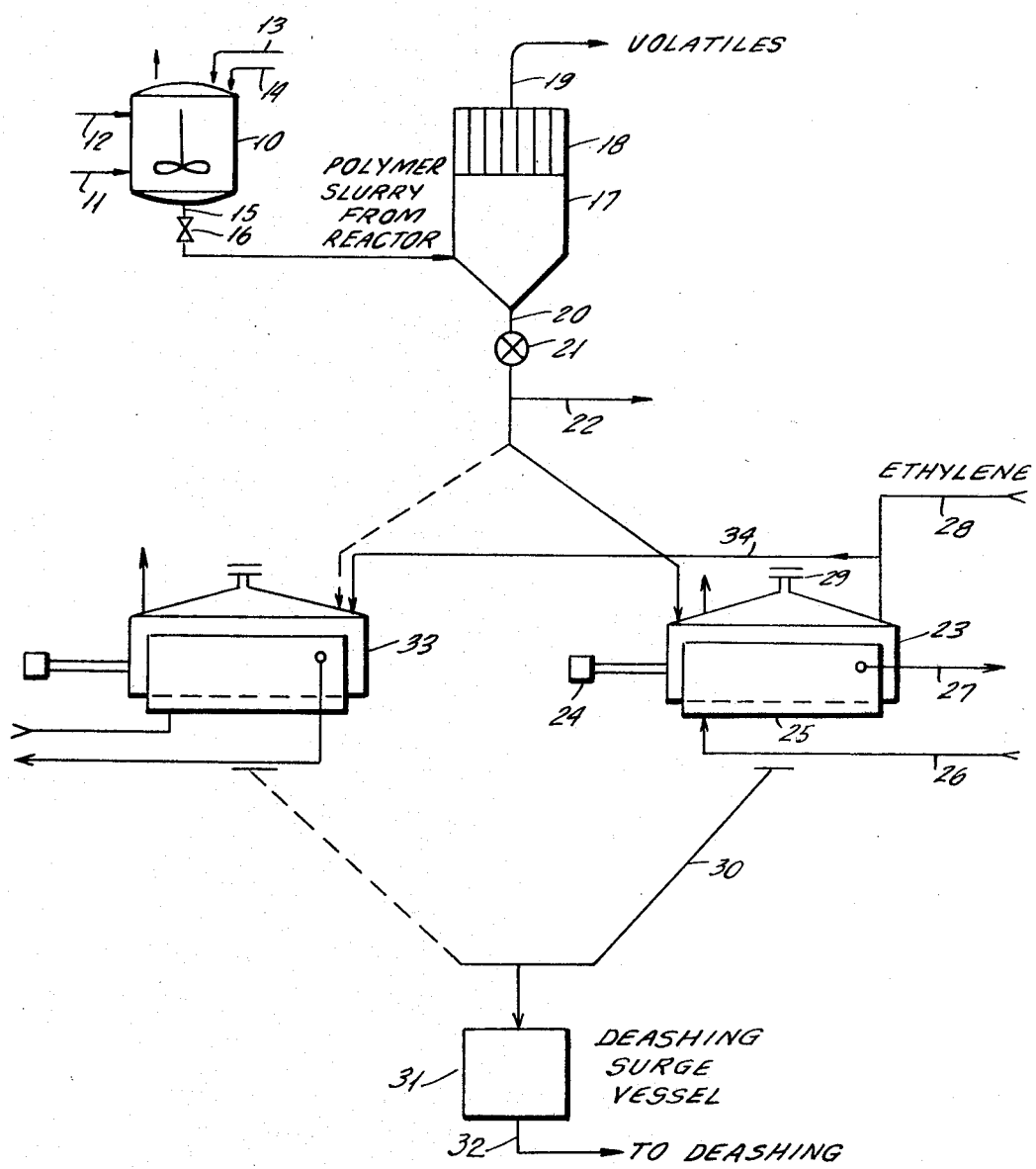

This application is a continuation of application Ser. No. 295,926, filed July 18, 1963, now abandoned.

This invention relates to a process for preparing block polymers from alpha-olefins wherein the polymer molecules consist essentially of a single section of one poly-alpha-olefin attached to a single section (block) of another poly alpha-olefin or copolymer of two or more alpha-olefin monomers. The process relates to a method for preparing one or more poly-alpha-olefin blocks in sequence to obtain modified polymers possessing useful physical and chemical properties.

As heretofore known, crystalline or isotactic polypropylene exhibiting high melting points and tensile strength can be prepared by polymerizing propylene in the presence of a solvent employing a catalyst system comprising solid particles of a metal subhalide of the metals of Groups IVa, Va and VIa of the Periodic Table according to Mendeléeff activated with an aluminum compound containing at least one carbon to metal bond. Generally, such processes produce polypropylene having a molecular weight of from about 30,000 to 1,000,000 or higher with the major proportion of the polymer being crystalline in that it exhibits a crystalline structure by X-ray analysis and is insoluble in boiling n-heptane.

Although polypropylene possesses many desirable physical properties which makes it useful in many applications, it is known to become quite brittle at low temperatures. Many prior art workers have advanced techniques for overcoming this latter undesirable property of polypropylene, the most promising being that of modifying its physical and chemical behavior by the technique of block polymerization.

In block polymerization, there is substantially effected a combination of the best physical and chemical properties of two or more polymers, for example, the combination of those of polypropylene with those of polyethylene. Thus, polyethylene, while not possessing melting points or tensile strengths as high as those of polypropylene, does in fact possess excellent low temperature properties such as brittleness and impact. When the outstanding properties of both of these polymers are combined in the technique of block polymerization, there results at once a heteropolymer useful in many new applications for which neither homopolymer was practically useful. Other alpha-olefin polymers can likewise be modified.

An object of this invention is the provision of a process for preparing block polymers from alpha-olefins.

A further object of this invention is the provision of a novel process for preparing block polymers from alpha-olefins in commercial quantities by a highly efficient vapor phase process.

A more specific object of this invention is the provision of a novel continuous process for preparing block polymers from alpha-olefins.

A still further specific object of this invention is the provision of a continuous vapor phase process for preparing block polymers of polypropylene containing attached thereto polyethylene or copolymers of ethylene and propylene in amounts sufficient to overcome the undesirable low temperature properties of the polypropylene resin.

This invention provides a sequential polymerization process for polymerizing at least one alpha-olefin monomer onto a preformed alpha olefin polymer wherein said prepolymer is formed by polymerizing an alpha-olefin in a hydrocarbon diluent to form a slurry, said polymerization being carried out in the presence of catalytic quantities of a catalyst formed by admixing a subhalide of a metal selected from the group of metals of Groups IVa, Va and VIa of the Periodic Table according to Mendeléeff and an aluminum compound containing at least one carbon to metal bond and after such polymerization to the desired molecular weight, introducing the preformed polymer slurry to a low pressure zone wherein volatile hydrocarbon constituents are flashed from the polymer to thereby obtain a substantially dry preformed polymer followed by introducing the substantially dry preformed polymer which still contains active catalyst residues into a continuously agitated reaction zone maintained at pressures of from 0 to 100 p.s.i.g. and temperatures of from 60° to 195° F. and introducing one or more alpha-olefin monomer into said continuously agitated reaction zone and polymerizing said alpha-olefin monomer onto the preformed polymer to an extent of from 1 to 40% by weight based on the total weight of the polymer.

In its broadest aspect this invention provides for a continuous sequential block polymerization process for polymerizing at least one alpha-olefin monomer onto a preformed alpha-olefin polymer containing active catalyst which comprises continuously introducing said preformed alpha-olefin polymer in finely divided form into at least one of a plurality of continuously agitated reaction zones, continuously moving said preformed polymer along the length of the reaction zone while introducing at least one alpha-olefin monomer into intimate contact with said preformed alpha-olefin polymer and polymerizing said monomer onto said prepolymer to an extent of from 1 to 40% by weight based on the weight of the total polymer formed.

A modification and preferred embodiment of the process of this invention comprises the steps of polymerizing an alpha-olefin monomer in a manner such as described above to obtain a polymer slurry containing from 5 to 60% total solids, introducing said slurry into a low pressure flashing zone wherein substantially all of the unreacted volatile monomer and other hydrocarbon constituents are flashed from the preformed polymer, continuously introducing polymer from this flashing zone to at least one of a series of continuously agitated reaction zones, continuously introducing at least one different alpha-olefin monomer into the first of said continuously agitated reaction zones and polymerizing up to 50% by weight of the total polymer to be attached to the preformed polymer, continuously moving said reaction mixture under agitation to a second continuously agitated reaction zone and adding at least one different alpha-olefin monomer and polymerizing to a total added polymer in an amount of up to 40% by weight and thereafter deashing the so-formed block polymer. Certain preferred monomers, polymers, catalyst, reaction temperatures and pressures will be set forth in the body of this specification.

A further embodiment of this invention comprises a continuous process for preparing block polymers by the steps of (a) introducing a preformed alpha-olefin polymer into at least one of a plurality of continuously agitated reaction zones, said prepolymer containing active catalyst residues therein and less than 10%, but preferably less than 5%, volatile constituents, the reaction zone being maintained at a pressure of from 0 to 100 p.s.i.g. and a temperature of from 60° to 195° F., (b) continuously or intermittently introducing at least one alpha-olefin monomer into intimate contact with said prepolymer and partially block polymerizing said monomer up to about 20%, but preferably up to 10% based on the total weight of the polymer to be produced, (c) introducing said preformed partially block polymerized polymer into at least one other agitated reaction zone maintained at preferably similar temperatures, for example, 110° to 195° F., and pressures as the first, that is, 0 to 100 p.s.i.g., and adding continuously or intermittently an alpha-olefin monomer and polymerizing from 10 or 20 percent of the monomer up to 20 or 40 percent of the total weight of the polymer produced.

As used throughout this specification and the claims of this invention, the following terms are intended to have the following meanings: (a) "preformed polymer" means a polymer of an alpha-olefin which is suitable for independent use, but which contains active catalyst residues; (b) "active catalyst residues" as used herein indicates catalytic components in the polymer which function to polymerize added monomeric substances without the need of adding further quantities of catalyst. The active catalyst residues referred to herein are preferably those initially employed in the homopolymerization of the alpha-olefin monomer unless otherwise indicated; (c) a "block polymer" has the same significance as heretofore understood in the prior art, that is, a polymer molecule consisting of a single section of an alpha-olefin polymer or copolymer attached to a single section of another alpha-olefin polymer or copolymer. Block polymers are intended to include two or more homopolymers sequentially polymerized one onto the other; a copolymer followed by a homopolymer; or alternating homo or copolymer blocks of two or more alpha-olefin monomers; (d) "volatile constituents" include unpolymerized alpha-olefin monomers, as well as inert hydrocarbon diluents such as ethane, propane, butane, pentane, hexane, heptane, octane, aromatic hydrocarbons, diesel oils and the like; (e) by polymerization in a "hydrocarbon diluent," it is intended that polymerization can occur in the presence of inert hydrocarbon diluents such as those named above in (d) or polymerizations wherein the monomer under conditions of temperatures and pressures is kept in liquid form during the polymerization, thereby serving as its own dispersing medium or mixture of inert hydrocarbons and olefin monomers in liquid form; (f) by "vapor phase" block polymerization and "substantially dry prepolymer" it is intended to mean that a preformed polymer contains in the order of 5% or less of volatile constituents, is reacted with gaseous monomers in the absence of added inert hydrocarbon diluents unless specifically so designated herein. Where normally liquid monomers are block polymerized in this process, they are introduced to the reaction as gases by employment of suitable reaction conditions; (g) by "catalytic quantities," it is intended to mean those quantities which are sufficient to form a prepolymer and can range in total amounts in the reaction zone from about 0.01 to 10 weight percent of the diluent present in that zone. The mole ratio of preferred catalytic quantities based on an aluminum/titanium ratio can vary within the range 0.01:1 to 3:1, but preferably 0.05:1 to 0.5:1.

Briefly, the preferred process of this invention includes the steps of forming a prepolymer in a reaction zone, employing a hydrocarbon diluent and a catalyst for the polymerization, as defined heretofore, carying out the polymerization to a solids content of from 5 to 60%, but preferably 20 to 40% to form a prepolymer which can be treated according to the subsequent steps herein defined, or taken directly to a deashing zone for inactivation and removal of soluble catalyst residues. The polymer from the reaction zone, according to this invention, is taken to a low pressure zone, such as a cyclone, but preferably a bag-filter cyclone combination wherein the volatile constituents are flashed from the polymer and taken through the filter, processed according to known techniques and recycled to the reaction zone, the amount of volatiles removed being sufficient so that no more than 5% volatile content remains in the prepolymer. In the prefered method of carrying out the block polymerization reaction, herein referred to as a vapor phase block polymerization, the polymer from the cyclone is taken to a continuously agitated reaction zone containing provisions therein for introducing an alpha-olefin monomer at one or more points along the length of the zone (and inert gases such as nitrogen) so that the active catalyst residues in the prepolymer polymerize said alpha-olefin monomer to a block thereby modifying the ultimate properties of the resin produced. The polymerization in the continuously agitated reaction zone is, in one embodiment of this invention, carried out at pressures lower than those used for the prepolymer preparation. The block polymer formed in the continuously agitated reaction zone in continuous operation is taken to a subsequent reaction zone to be described more fully below and then to suitable deashing facilities for inactivation, solubilization and removal of catalyst residues.

To modify the melt behavior of the polymers prepared according to the process of this invention, hydrogen in amounts of 10 to 50 mole percent can be used in either the propolymer reaction or in the block polymer preparation. Other known chain regulators can be used instead of hydrogen.

Suitable continuously agitated reaction zones include one or more rotary kilns in series wherein agitation occurs by movement of the reactor and wherein an alpha-olefin monomer(s) in the gaseous form can be introduced to flow currently or counter-currently to the movement of the polymer in the reaction zone. The reaction zone can also consist of a pipe line reactor with suitable jacketing for heat removal and suitable monomer introduction points as well as agitating means. According to the preferred embodiment of this invention, ribbon blenders in series are provided for continuous operation, as will be set forth more fully hereinbelow. It has not heretofore been known to employ ribbon blenders as reactors in polymerization reactions as set forth herein. Reference will hereinafter be made to a semi-continuous batch and a continuous process for preparing block polymers wherein ribbon blenders are used in the process.

Figure 2:
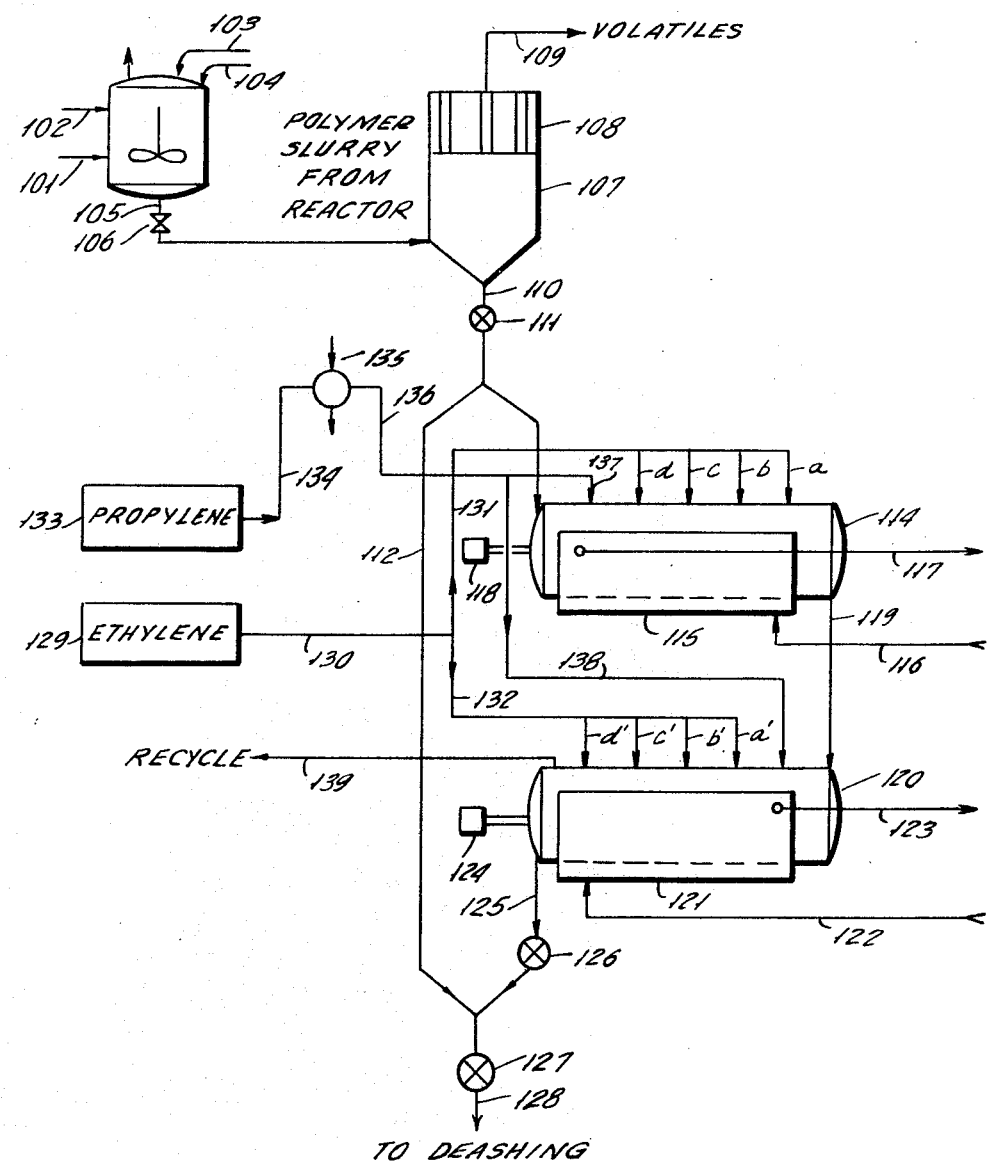

The attached drawings, FIGS. 1 and 2, which form part of this invention, illustrate a semi-continuous batch polymerization process with provisions for two continuously stirred reaction zones such as two ribbon blenders continuous operation (FIG. 1) and a truly continuous polymerization process illustrating the preferred embodiment of this invention wherein two ribbon blenders in series are employed (FIG. 2). Suitable provision can be made, for use of further reactors in series for the continuous vapor phase block polymerization.

FIG. 1 represents an operation with provisions made (dotted lines) so that alternate batch reactors can be operated in a semi-continuous fashion. In this presentation, reactor 10 is employed for preparing the alpha-olefin prepolymer (in this case polypropylene) by introduction of propylene to the reactor through line 11. Propylene in the preferred method of operation is introduced into the reactor in liquid form and catalyst components titanium trichloride and diethylaluminum monochloride, introduced through line 12 (or other lines not shown) for example, are employed to prepare a high isotactic content polymer. Recycle propylene and/or inert diluents such as propane or butane are introduced through line 13, while hydrogen can be introduced into the reactor through line 4. Polymerization is accomplished in the reactor at pressures of about 150 to 750 p.s.i.g. to a solids content of from 20 to 40 percent. The polymer forms as particles in the diluent (propylene and/or propane or butane) and is withdrawn from the reactor as a slurry via line 15 continuously or substantially continuously through valve 16 to the cyclone-bag filter combination 17 and 18. Volatiles are flashed from the polymer slurry in this unit which is maintained at pressures of from 0 to 25 p.s.i.g. and temperatures of 40° to 150° F. The volatiles which include unreacted propylene (and propane or butane when used in the process as diluents or higher molecular weight paraffinic hydrocarbons) are taken via line 19 for further processing and recycle to reactor 10.

By the application of the pressures and temperatures indicated above to the polymer slurry introduced to the cyclone-bag filter combination, there is obtained a substantially dry polymer powder in finely divided form containing less than about 5% by weight of volatiles, which is taken via line 20 and valve 21 to either a deashing treatment through line 22 or, according to the process herein, to block polymerization facilities. The block polymerization reactor indicated at 23 is suitably a continuously agitated ribbon blender. Agitation in this vessel is accomplished by a power drive 25 which continuously rotates a series of ribbon blades (not shown) in reactor 23. A fluid, such as circulating water, for addition or removal of heat from the exothermic block polymerization reaction is circulated to the reactor jacket 25 via line 26 and exits through line 27.

Block polymerization is accomplished according to this embodiment by introducing ethylene to the reactor 23 through line 28 in one or more sections of the reactor. After the addition of the desired amount of block polymer to the polypropylene, the total polymer is removed from reactor 23, for example, by inverting the vessel to engage suitable connections, such as line 30 through outlet 29 to deashing surge vessel 31. From vessel 31, the polymer is taken through line 32 to further deashing treatment.

Semi-continuous operation of the above process can be provided for by utilization of reactor 33 in a manner similar to reactor 23. Thus, while reactor 23 is being prepared for the next cycle, reactor 33 can be in the process of block polymerization (ethylene being introduced through line 34), etc.

FIG. 2 represents the preferred process of this invention for preparing block polymers. In this presentation, units and lines indicated by numbers 100 through 112 correspond to numbers 10 through 22 of FIG. 1 as shown. Formation of a polypropylene slurry in reactor 100 occurs in a manner similar to that in reactor 10 of FIG. 1.

As in the process of FIG. 1, a substantially dry prepolymer of propylene containing less than about 5 percent volatiles is taken from cyclone-bag filter combination 107 and 108 in FIG. 2. In this preferred embodiment, the prepolymer is taken continuously through line 110, valve 111 and line 113 to the first of two reactors in series. Reactor 114, the first reactor, is provided with suitable heat exchange means indicated by jacket 115 and circulating fluid lines 116 for introducing a medium such as water and line 117 to convey the medium from the reactor to further heat exchange arrangements (not shown). A power drive indicated at 118 is provided for rotating a series of ribbon blades and/or paddles (not shown) in the reactor. By suitable arrangements of the agitation equipment provided within the reactor, the polymer can be moved continuously to one end and continuously discharged through line 119 to the second reactor 120. The polymer powder, however, substantially independently of any agitation, behaves much like a fluid and "flows" or moves from the inlet end of the reactor to the outlet end, that is, flows along the length of the reactor in much the same manner as a fluid like a liquid would. Reactor 120 is provided with jacketing 121, heat exchange fluid and lines 122, 123 and power drive 124 for rotation of ribbon blades and/or paddles (not shown) in reactor 120 similar to reactor 114. Again, as in reactor 120, the polymer flows continuously to one end and continuously discharges through line 125 valve 126, and to suitable deashing facilities (not shown) through valve 127 and line 128.

Block polymerization is carried out according to this process by continuously introducing ethylene from unit 129 through line 130 which is divided to lines 131 and 132 and further provided with various ethylene introduction lines $a$, $b$, $c$, $d$ to reactor 114 and $a'$, $b'$, $c'$, $d'$ to reactor 120. Thus, ethylene can be introduced continuously or intermittently to both reactors at one or more points depending on the method of operation and the desired block polymer.

Where sequential block polymerization is to be accomplished, that is, polypropylene-polyethylene-polypropylene or polypropylene-ethylene-propylene rubber or random copolymers or followed by polypropylene or polyethylene, then propylene can be introduced, in the amounts desired, from unit 133, line 134, heater 135 and line 136 which is split to lines 137 and 138 for introduction to one or more points (one indicated) in reactors 114 and 120 similarly to the ethylene introduction. The amount of propylene introduced can be varied so that, for example, it can be mainly used to maintain an appropriate pressure in the reactor(s) if desired. Nitrogen can likewise be used. Where propylene is used for the purpose indicated, there will be some beneficial random copolymerization with ethylene. Ethylene, however, by virtue of its greater reactivity, enters the polymerization at a faster rate than propylene, so that depending on the partial pressure of the gaseous propylene, substantially only polyethylene blocks can be formed where this method of operation is preferred. Unreacted olefin monomers can be recycled if desired through line 139 (recycled to either or both of the reactors or disposed of in some other manner).

As will be appreciated, the arrangement of units as set forth hereinabove forms an extremely versatile method of operation for preparing innumerable block polymer combinations. Introduction of ethylene or other alpha-olefin monomer can be continuous to both reactors or to one reactor only, or ethylene can be introduced to the first or second reactor while butene-1 can be introduced to either simultaneously with ethylene or to one reactor only. It can be seen that many arrangements for forming block polymers can be practiced.

Any alpha-olefin monomer of from about 2 to 10 carbon atoms or more can be employed to form a prepolymer, Included herewith are ethylene, propylene, butene-1, isobutene-1, pentene-1, hexene-1 and higher, as well as branched alpha-olefins such as 3-methyl butene-1,4-methyl pentene-1 and higher. As block forming alpha-olefin monomers, substantially similar monomers as those used for prepolymer formations or mixtures thereof can be used. Typical block polymers which can be prepared according to the process herein are polypropylene-polyethylene; polypropylene-ethylene propylene rubber; polyethylene-polypropylene; polyethylene-polypropylene-ethylene propylene rubber; polybutene-polypropylene; polypropylene-poly-3-methyl butene-1, or any combination of the foregoing containing alternate polymers or copolymers in the chain. The preferred prepolymer is polypropylene and the preferred block polymers are polyethylene and random copolymers of ethylene and propylene. Polybutene is also preferred as either a prepolymer or a block polymer for incorporation onto polypropylene. The prepolymer, for example polypropylene, can have a molecular weight of from 20,000, preferably 30,000 to 1,000,000 or higher. Suitable prepolymers are those of a molecular weight of from 50,000 to 500,000. The block polymers formed on the prepolymer can likewise be of high molecular weight, for example, above or below 20,000 in the case of polyethylene. The molecular weights expressed herein can be determined by methods known in the art, such as by intrinsic viscosity measurements (J. Polymer Science, 8, 361, 1952).

Although catalytic materials which have heretofore been indicated as useful include a metal subhalide from the groups IVa, Va and VIa of the Periodic Table according to Mendeléeff, for example, titanium trichloride and the subhalides of vanadium, zirconium, thorium, etc., the preferred Group IVa metal is titanium trichloride and more specifically titanium trichloride cocrystallized with aluminum chloride according to the formula $nTiCl_3 \cdot AlCl_3$ where $n$ is a number of from 1 to 5. As activators for the titanium trichloride, the aluminum compounds containing at least one carbon to metal bond are preferred. Exemplary of such compounds are trialkyl aluminums wherein the alkyl groups contain from 1 to 10 carbon atoms, but preferably aluminum triethyl or dialkyl aluminum monohalides wherein the alkyl groups contain from 1 to 10 carbon atoms and the halide is chlorine.

Temperatures at which the prepolymer formation can be carried out are those known in the art, for example, from 50° to 250° F., but preferably from 70° to 180° F., The pressures in the prepolymer formation can range from atmospheric or below where normally liquid inert hydrocarbon diluents are used (heptane or hexane) to pressures up to 1,000 p.s.i.g. or higher where the monomer is used as its own dispersing agent or the monomer in admixture with a normally gaseous hydrocarbon diluent such as propane or butane, which are liquid under the conditions of the reaction.

In the block polymerization reaction, polymerization temperatures can be the same as in the prepolymer formation, for example, from room temperature to 195° F., but preferably from 130° to 175° F. Since, in the preferred embodiment of this invention, the reaction is carried out in vapor phase, the pressures are lower than those used in preforming the polymer, that is, pressures of 10 to 50 p.s.i.g. or somewhat higher.

With further reference to FIG. 2, the continuous process of this invention is carried out by continuously introducing preformed polymer from the cyclone to the first stage reactor, which reactor is provided with agitation means such as ribbon blades or paddles. In this stage, it is preferred to add up to 10% by weight as a block of polyethylene based on the total weight of the polymers to be produced and continuously move the polymer to the second stage reactor where an additional 10% by weight, that is, a total of 20% of polyethylene is incorporated as a block in both reactors. It has been found according to this invention that by employing two agitated polymerization reactors in series, that an extremely versatile system is provided, in that (1) the reaction can be made continuous, (2) heat transfer can be more efficiently handled, (3) a variety of monomers can be continuously introduced, whether they be the same or different, to either or both of the agitated reactors. Thus, preformed polypropylene can be introduced to the first reaction zone, a block of polyethylene formed thereon and this continuously removed to the second reaction zone wherein a further addition of polyethylene can be continued or a random copolymer of ethylene and propylene can be added, all in vapor phase fashion. From the second (or third, where such an additional stirred reaction zone is provided) the block polymer can be taken directly to a deashing vessel for treatment according to techniques known in the art.

The amount of block based on the total weight of the block polymer which can be incorporated can usually range from 1 to 40% by weight of the total polymer produced. Thus, amounts as little as 1% by weight of polyethylene as a block affect the properties of a polymer such as polypropylene. Amounts higher than 40%, while not excluded from the process herein, tend to result in polymers other than the preferred block polymers of this invention. Preferably, the amount of polymer to be polymerized onto the preformed polymer ranges from 10 to 20 weight percent and according to the preferred two-step technique for adding this block polymer, up to 10% is added in the first reaction zone with the remainder, that is, up to 20% or higher based on the total polymer formed, in the second zone. In this two-step technique, up to 20% can be added in the first step and from 20 to 40 percent in the second step.

The following specific examples illustrate a batch technique for incorporating polyethylene and ethylene-propylene random copolymer blocks into polypropylene. An example showing a large scale block polymerization run in accordance with FIG. 2 of this invention is also provided herein.

Properties of block polymers as prepared herein were determined as follows: (a) Melt Index: expressed in decigrams per minute as measured by ASTM-D-1238-57T employing a temperature of 230° C., (b) Percent Olefin Incorporation: determined by infrared analysis, (c) Percent Heptane Insolubles: the polymer is extracted with boiling n-heptane, (d) Crystalline Melting Point: measured with a microscope under crossed nicols, (e) Notched Impact Brittleness Temperature ° C.: ASTM designation D-746-57T, except that different sample bars (.25″ wide x 1.5″ long x 0.075″ thick) are cut from sheets pressed at 400° F. The sheets are cooled in the press at 25° F. per minute. The samples are placed in the Scott Tester with the width parallel to the impact bar. A notch 0.015″ deep is cut across the thickness with a razor sharp edge, (f) Gurley Stiffness mg./20 mil: Gurley Stiffness Tester Procedure, (g) Tensile Strength at Yield, p.s.i.: ASTM designation D-638-60T, except that a ¼″ wide x 0.020″ thick x 4″ length strips cut from a 6″ sheet (pressed at 400° F. and cooled at 25° F. per minute) are clamped in the Instron with a one inch jaw separation and pulled at 20″ per minute. The modulus at 1% strain is determined at a pull speed of 0.2″ per minute with a 2″ jaw separation.

In batch operation in accordance with unit arrangements shown in FIG. 1, the following procedure was used. Prepolymer from the cyclone was taken to reactor 23 which had been previously heated to 100° F. and vented to 5 p.s.i.g. Nitrogen (facilities for this introduction not shown) was introduced to the reactor to raise the pressure to 13 p.s.i.g. Steam was thereafter circulated through the reactor jacket and turned off when the temperature in the reactor reached approximately 120° F. Ethylene was then added to raise the pressure to 18 p.s.i.g. This pressure was maintained with nitrogen during the run. Ethylene feed rate was fixed at levels where the temperature could be controlled at about 140° to 160° F. Water or chilled alcohol was also used to aid in temperature control by circulating in the reactor jacket. The ribbon speed for the various runs reported herein was from 42 to 84 r.p.m. by means of drive 24. Batch block polymerization runs 1 through 8 were carried out using the above indicated procedure unless otherwise noted. The properties of the polymers are reported in the table below.

EXAMPLE 1

Run No. 1 was carried out according to the above general procedure by block polymerizing ethylene onto polypropylene prepolymer prepared in accordance with procedures heretofore indicated. A total of 145 lbs. of polymer was removed from the reactor at the conclusion of the reaction period of about one hour. The temperature in the reactor was held constant at 146° F. throughout the run using chilled water in the jacket. More details on this and subsequent runs are shown in the table below.

EXAMPLE 2

Run No. 2: This was similar to Run No. 1 except that 138 lbs. of total polymer were prepared. Temperature during the run which lasted about 2½ hours was maintained at 150° to 152° F. Ice water was used to aid in temperature control.

EXAMPLE 3

Run No. 3: In this run, propylene gas was used to pressure the reactor instead of nitrogen as set forth above. The reactor was heated to 100° F. and vented to 5 p.s.i.g. followed by pressuring with propylene to 13 p.s.i.g. and then ethylene to 18 p.s.i.g. Propylene was also used to maintain the pressure at 18 p.s.i.g. This was, therefore, a random block polymer run and 140 lbs. of total polymer were produced.

EXAMPLE 4

Run No. 4: This was a run similar to Example 3 except that ethylene and nitrogen were used to maintain the reactor pressure during the run at about 18 p.s.i.g. after pressuring with propylene to 13 p.s.i.g. The rate of ethylene introduced varied and when this occurred nitrogen was used to maintain the desired pressure. About 140 pounds of total polymer were produced.

EXAMPLES 5 THROUGH 8

Runs 5 through 8: All of these runs were similar to Example 4. Temperatures were generally maintained at between 150° to 160° F. Run 5 produced 110 lbs. of total polymer, while runs 6 through 8 produced between 60 to 100 lbs. for runs lasting from 40 minutes to 90 minutes. Examples 4 through 8 contain some ethylene-propylene polymer blocks by virtue of the method of operation, with polyethylene being preponderantly present.

EXAMPLE 9

In a commercial operation for block polymerizing about 10 percent by weight (based on the total weight of polymer produced) of ethylene is incorporated into a polypropylene prepolymer of about 90 percent isotactic content in a continuous operation according to a process scheme as substantially illustrated in FIG. 2. The following is the material balance in pounds per hour in the units illustrated in normal operation:

| Line | Composition | Lbs./hr. |
|---|---|---|
| 110 (Leading to reactor 114) | Isotactic Polypropylene | 3,429 |
| 136 | Proyplene | 20.2 |
| 130 | Ethylene | 350.3 |
| 139 | Monomers: | |
| | Propylene, 8.2 lbs./hr | 19.5 |
| | Ethylene, 7.4 lbs./hr | (1) |
| | Propane, 3.9 lbs./hr | (1) |
| 125 | Block Polymer | 3,810 |

[1] Total recycle.

In the above operation, the ethylene monomer addition occurs in both reactors 114 and 120. By partial addition of the monomer to each of the reactors, better heat control is realized. The reaction conditions for both reactors are pressure of about 20 p.s.i.g. and a temperature of 150° F. The polypropylene prepolymer introduced to cyclone 107 is polymerized in a mixed hydrocarbon diluent system in reactor 100. The mixed diluent is comprised of liquid propane and liquid propylene. Polymerization is carried out in the presence of a titanium trichloride catalyst activated with diethylaluminum monochloride (mol ratio of Al/Ti of 2:1 to 4:1) at a pressure of from 350 to 750 p.s.i.g. at a temperature of from

TABLE.—SUMMARY OF BLOCK POLYMER RUNS 1 THROUGH 8

| Run No. | Ethylene Incorporated I.R. Data | | Block Polymer | | | Prepolymer | |
|---|---|---|---|---|---|---|---|
| | Percent Total | Percent Min. | Heptane Ins., Percent | Melt Index | Brittle Point, °C. | Heptane Ins., Percent | Melt Index |
| 1 | 16.0 | 0.16 | 91.6 | 0.9 | 15 | 90.0 | 4.6 |
| 2 | 11.0 | 0.07 | 94.0 | 0.2 | 1 | 95.9 | 0.6 |
| 3 | 9.6 | 0.05 | 85.0 | 0.3 | −1 | 92.8 | 1.2 |
| 4 | 8.5 | 0.14 | 89.4 | 0.7 | −4 | 92.7 | 1.4 |
| 5 | 8.1 | 0.16 | 88.1 | 0.6 | 2 | 93.2 | 6.1 |
| 6 | 16.6 | 0.30 | 94.3 | 0.6 | 4 | 93.8 | 5.3 |
| 7 | 11.5 | 0.14 | | 0.8 | 2 | 94.5 | 4.8 |
| 8 | 11.7 | 0.11 | 93.3 | 2.1 | 7 | 94.2 | 6.4 |

Runs 2 through 8 demonstrate the preparation of block polymers with excellent improved brittle point properties. Runs 2, 6 and 8 demonstrate further that by proper control of the block polymerization reaction, high crystallinity can be maintained in the ultimate polymer where this is desired. The brittle point properties of the prepolymers used to form the block polymers were all high, that is, in the neighborhood of 65° F. to 75° F., which is typical of unmodified homopolymers of propylene of high isotactic content (that is, above 80 percent). Crystalline melting points of the block polymers remained high, that is, higher than 160° C. Tensile strength at yield and modulus at 1% strain ×10$^{-3}$ of the block prepared herein remained substantially unaffected. For example, in smaller bench scale runs, prepolymers were prepared as control runs and these had typical tensile strengths at yield, p.s.i. of around 4600 to 5100, Gurley Stiffness mg./20 mil of 6000 to 7000, modulus at 1% strain ×10$^{-3}$ of 170 to 176 and Crystalline Melting Points of about 171° C. Block polymers produced for comparison incorporating 10 to 17 percent by weight of ethylene by infrared analysis had tensile strengths of 4600, Gurley Stiffness of 5500 to 5800, modulus at 1% strain ×10$^{-3}$ of 130 to 177 and Crystalline Melting Points of about 167° C.

The successful modification of polypropylene by block polymerization enables its use in many applications hitherto considered marginal, for example, for outdoor usage where cold ambient temperatures previously reduced the utility of this resin.

115 to 170° F. to a conversion of about 40 percent total solids in a slurry in the mixed diluent. The slurry is flashed in cyclone-bag filter to a substantially dry powder containing less than about 5 percent volatiles.

In the above example, the block polymer formed on the polypropylene prepolymer is predominantly polyethylene. Some small amount of random copolymer may be formed due to the presence of propylene in small amounts in the feed and also due to its use in aiding in maintaining the reactor pressure desired and a suitable polymerization atmosphere.

Example 9 represents a truly continuous operation of a block polymerization process for preparing desired block polymers possessing low temperature brittleness and excellent impact properties. All of the foregoing block polymers prepared as set forth above possess desirable low temperature impact as determined by Izod measurement.

The use of reactors in series, specifically ribbon blender types, contributes unique advantages to the process of this invention. Thus, data obtained concerning heat transfer indicates unexpectedly high heat transfer coefficients, probably due to the close clearance between the ribbon (or paddle) and the heat transfer surface. Furthermore, entrainment, which is a serious problem in fluid bed reactor devices, is avoided due to the configuration of the reactor. Also, fouling is not encountered since close temperature control is possible as a result of the mixing and high heat transfer coefficients obtained.

Modifications can be made to the process of this in-

What is claimed is:

1. A continuous sequential vapor phase block copolymerization process for the preparation of block copolymers of improved low temperature brittleness properties which consists essentially of the steps of (a) introducing a preformed flowable alpha-olefin polymer powder of a molecular weight of from 50,000 to 500,000 prepared from an alpha-olefin containing at least three carbon atoms, said alpha-olefin polymer consisting of at least 80% by weight of the final copolymer of step (d), at one end of at least one of a plurality of continuously agitated reaction zones, said alpha-olefin polymer containing therein active catalyst residues comprising a mixture of a subhalide of a metal selected from the group of metals of Groups IVa, Va and VIa of the Periodic Table according to Mendeléeff and an aluminum compound containing at least one carbon to metal bond, and containing less than about 5% volatile constituents therein, (b) introducing at least one alpha-olefin monomer other than alpha-olefin used in preparing said polymer in vapor form, through at least one of a plurality of inlet lines into the reactor, into intimate contact with said preformed alpha-olefin polymer powder containing active catalyst residues therein, (c) continuously moving said powder from the inlet end of said reactor to the outlet end thereof while in contact with said introduced olefin monomer in vapor form, said movement of polymer being caused at least in part by the agitation provided in said reactor, (d) introducing the resulting polymer powder from steps (b) and (c) into a second continuously agitated reaction zone and adding further an alpha-olefin monomer in vapor form and polymerizing said alpha-olefin monomer onto said polymer powder, and recovering from said second zone a block copolymer containing up to 20% by weight of the total polymer of copolymerized alpha-olefin monomer.

2. The process of claim 1 wherein polypropylene is the preformed alpha-olefin polymer and wherein polyethylene is the block polymer formed in steps (b), (c) and (d).

3. A continuous vapor phase block copolymerization process for the preparation of block copolymers of improved low temperature brittleness properties consisting essentially of the following steps: (a) introducing a preformed flowable propylene polymer powder of a molecular weight of from 50,000 to 500,000, said polypropylene consisting of at least 60 percent of the final copolymer of step (d) into at least one end of one of a plurality of continuously agitated reaction zones, said propylene polymer powder containing active catalyst residues therein, said catalyst residues being the product formed upon admixing titanium trichloride with an aluminum compound containing at least one carbon to metal bond and said preformed propylene polymer powder containing less than about 5% volatile consituents therein, said reaction zone being maintained at a temperature of from 60° to 195° F. and a pressure of from 0 to 100 p.s.i.g., (b) introducing at least one alpha-olefin monomer other than propylene in vapor form, through at least one of a plurality of inlet lines into the reactor, into intimate contact with said preformed propylene polymer powder containing active catalyst residues therein, (c) continuously moving said powder from the inlet end of said reactor to the outlet end thereof while in contact with said introduced olefin monomer in vapor form while partially copolymerizing said alpha-olefin monomer vapor onto said preformed polymer, (d) introducing said preformed partially copolymerized propylene polymer from step (c) into a second continuously agitated reaction zone maintained at a temperature of from 110° to 195° F. and a pressure of from 0 to 100 p.s.i.g. and adding alpha-olefin monomer in vapor form and polymerizing said alpha-olefin monomer up to 40 weight percent based on the total weight of the polymer formed.

4. A process according to claim 3 wherein ethylene is block copolymerized onto the preformed polypropylene in steps (b), (c) and (d).

5. The process of claim 3 wherein from 1 to 10% by weight of ethylene is polymerized in step (c) onto the prepolymer of step (a).

6. The process of claim 3 wherein a comonomer mixture of ethylene and propylene is block copolymerized onto the preformed polypropylene in steps (b), (c) and (d) in an amount of 1 to 10% by weight.

7. A continuous sequential vapor phase block copolymerization process for the preparation of block copolymers of alpha-olefins having at least three carbon atoms of improved low temperature brittleness properties which consist essentially of the steps (a) introducing a preformed flowable alpha-olefin polymer, having a molecular weight of from 50,000 to 500,000, in powder form in an amount of at least 60% by weight of the final copolymer product of step (c) into at least one end of at least one of a plurality of continuously agitated reaction zones, said alpha-olefin polymer powder containing therein active catalyst residues comprising a mixture of a subhalide of a metal selected from the group of metals of Groups IVa, Va and VIa of the Periodic Table according to Mendeléeff and an aluminum compound containing at least one carbon to metal bond, and containing less than about 5% volatile constituents therein, (b) introducing at least one alpha-olefin monomer other than the alpha-olefin used to prepare said polymer in vapor form through at least one of a plurality of inlet lines into the reactor into intimate contact with said preformed alpha-olefin polymer powder, (c) continuously moving said polymer powder from the inlet end of said reactor to the outlet end thereof while in contact with said introduced olefin monomer vapor, said movement of polymer powder being caused at least in part by the agitation provided in said reactor and polymerizing said olefin monomer vapor onto said polymer powder to an extent of from 1 to 40% by weight based on the weight of the total polymer formed.

8. In a sequential block copolymerization process for polymerizing at least one alpha-olefin monomer onto a preformed alpha-olefin polymer of an olefin having at least three carbon atoms wherein said prepolymer is formed by polymerizing an alpha olefin monomer having at least three carbon atoms in a hydrocarbon diluent to form a slurry, said polymerization being carried out in the presence of catalytic quantities of a catalyst formed by admixing a subhalide of a metal selected from the group of metals of Groups IVa, Va and VIa of the Periodic Table according to Mendeléeff and an aluminum compound containing at least one carbon to metal bond, the method for improving the low temperature brittleness properties of said prepolymer which consists essentially in the steps of (a) introducing said preformed polymer slurry to a low pressure zone maintained at about 0 to 25 p.s.i.g. and at a temperature of from 40° to 150° F. and flashing from said slurry volatile hydrocarbon consistuents to obtain a substantially dry flowable preformed polymer powder having a molecular weight of from 50,000 to 500,000 containing active catalyst residues therein, (b) introducing said substantially dry preformed polymer powder in an amount of at least 60% by weight based on the final polymer of step (d) and containing said active catalyst residues into one end of a continuously agitated reaction zone maintained at pressures of from 0 to 100 p.s.i.g. and temperatures of from 60° to 195° F., (c) introducing at least one alpha-olefin monomer other than the olefin used to prepare said prepolymer in vapor form through at least one of a plurality of inlets into said reactor and into intimate contact with said preformed polymer powder and (d) moving said powder from the inlet end of said reactor to the outlet end thereof while in contact with said introduced olefin monomer vapor and polymerizing said monomer onto said prepolymer powder to an extent of from 1 to 40% by weight based on the weight of the total polymer.

9. In a continuous sequential block copolymerization process for polymerizing ethylene or ethylene and propylene onto a preformed propylene polymer wherein said propylene polymer is prepared by polymerizing propylene monomer in a hydrocarbon diluent to form a slurry, said polymerization being carried out in the presence of catalytic quantities of a titanium trichloride activated with aluminum compound containing at least one carbon to metal bond, the method for improving the low temperature brittleness properties of said propylene polymer which consists essentially in the steps of (a) introducing said preformed propylene polymer slurry into a low pressure zone maintained at about 0 to 25 p.s.i.g. and at a temperature of from 40° to 150° F. and flashing from said slurry volatile hydrocarbon constituents to obtain a preformed flowable propylene polymer powder of a molecular weight of from 50,000 to 500,000 containing less than about 5% volatile constituents therein and active residues of said catalytic quantities, (b) introducing said prepolymer propylene powder in an amount of at least 60% by weight of the final copolymer of step (d) into at least one end of at least one of a plurality of continuously agitated reaction zones maintained at pressures of from 0 to 100 p.s.i.g. and temperatures of from 60° to 195° F., and (c) introducing at least one alpha-olefin monomer other than propylene in vapor form, through at least one of a plurality of inlet lines into the reactor into intimate contact with said preformed propylene polymer, (d) continuously moving said prepolymer propylene powder from the inlet end of said reactor to the outlet end thereof while in contact with said introduced olefin monomer vapor while partially copolymerizing said alpha-olefin monomer onto said preformed propylene polymer powder, (e) introducing the polymer powder from step (d) into a second reaction zone and introducing additional alpha-olefin vapor into contact therewith and polymerizing said monomer onto said prepolymer and recovering a block copolymer containing from 1 to 40 percent by weight based on the weight of the total polymer of incorporated olefin monomer.

References Cited

UNITED STATES PATENTS 2,956,994   10/1960   Peterlein _____ 260—94.9
3,301,921   1/1967    Short _____ 260—878

FOREIGN PATENTS 258,741   3/1961   France.

MURRAY TILLMAN, Primary Examiner

M. J. TULLY, Assistant Examiner

U.S. Cl. X.R.

260—93.7, 94.9